Figure 1:
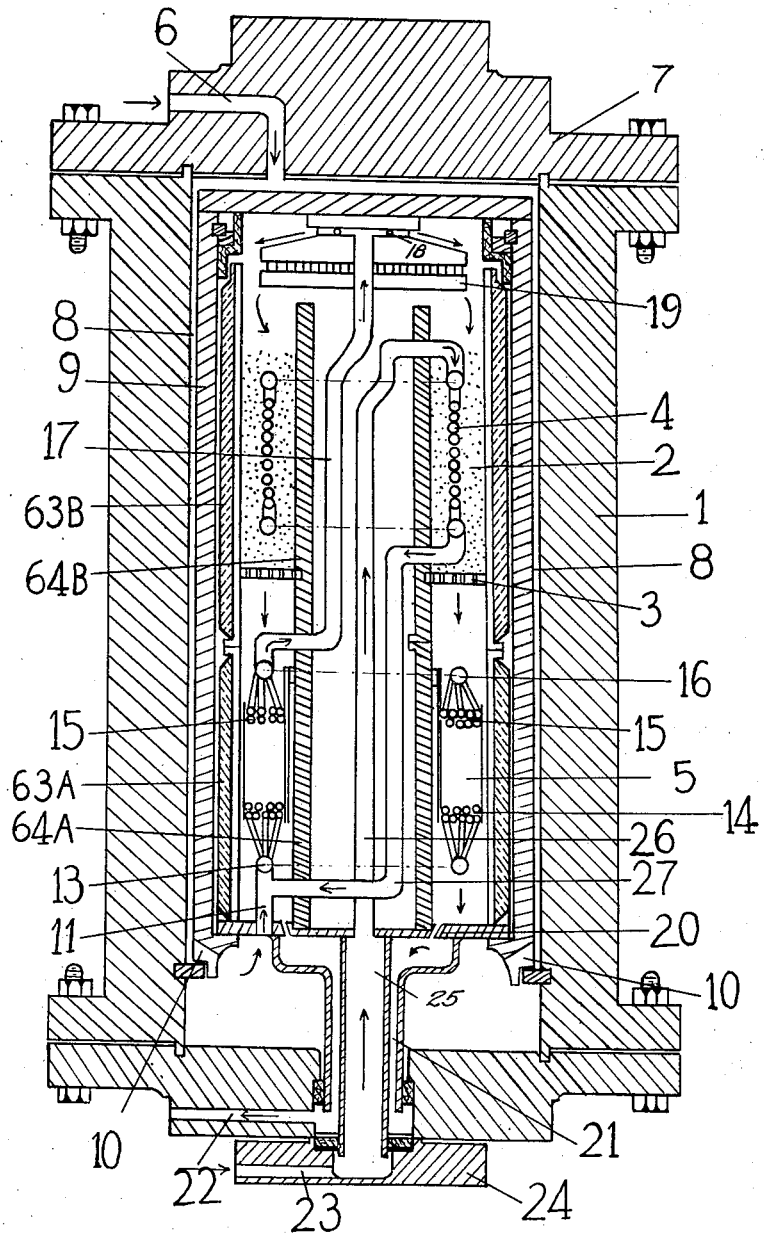

Aug. 18, 1936.    R. V. KLEINSCHMIDT    2,051,774
CONVERSION PROCESS AND APPARATUS FOR CATALYTIC CHEMICAL REACTIONS
Filed Nov. 3, 1932    3 Sheets-Sheet 1

INVENTOR.
Robert V. Kleinschmidt
BY
ATTORNEY.

Aug. 18, 1936.   R. V. KLEINSCHMIDT   2,051,774
CONVERSION PROCESS AND APPARATUS FOR CATALYTIC CHEMICAL REACTIONS
Filed Nov. 3, 1932   3 Sheets-Sheet 3

INVENTOR.
Robert V. Kleinschmidt
BY
ATTORNEY.

Patented Aug. 18, 1936

2,051,774

UNITED STATES PATENT OFFICE 2,051,774

CONVERSION PROCESS AND APPARATUS FOR CATALYTIC CHEMICAL REACTIONS

Robert V. Kleinschmidt, Stoneham, Mass., assignor to E. I. du Pont de Nemours & Company, Wilmington, Del., a corporation of Delaware Application November 3, 1932, Serial No. 640,999

22 Claims. (Cl. 23—288)

The present invention relates to high pressure synthesis process and apparatus for conducting chemical reactions in the vapor phase and more particularly it relates to a process and apparatus for use in the high pressure catalytic synthesis of methanol and other oxygen-containing organic compounds from hydrogen and the oxides of carbon.

When hydrogen with carbon monoxide or carbon dioxide, or a mixture of the two oxides, is passed over a catalytic mass comprising certain metals or their oxides at a pressure in excess of 100 atmospheres and at a temperature of about 350–450° C. methanol is produced. The reaction of the carbon oxides with hydrogen to form methanol is exothermic and accordingly heat is generated in the catalytic mass thru which the gases pass during the formation of the methanol. This results, if not dissipated, in degradation of the catalyst, fluctuation in the yield of the alcohol, undesirable side reactions, and numerous other difficulties. Furthermore, it has been found that variations in the percentage of carbon oxide in the entering gases changes considerably the temperature conditions of various portions of the catalyst bed. Consequently, many types of conversion apparatus have been devised in order to control more accurately the temperature conditions within the catalytic bed. The converters heretofore proposed, however, have not been entirely satisfactory due to their inflexibility and lack of means providing accurate temperature control.

An object of the present invention is to provide a process and apparatus for conducting catalytic vapor phase reactions, which is characterized by accurate temperature control within the catalyst chamber and, when employed for the synthesis of methanol from carbon oxides and hydrogen, results in autothermal operation. Another object of the invention is to provide a process wherein the heat content of reaction gases is controlled by internal heat exchange with the catalyst and by external heat exchange with the gases issuing therefrom. Another object of the invention is to provide means whereby various heat exchange units within the conversion apparatus may be controlled at the proper temperature by means of a regulated supply of cold gases. Other objects and advantages of the process and apparatus will hereinafter appear.

Figure 2:
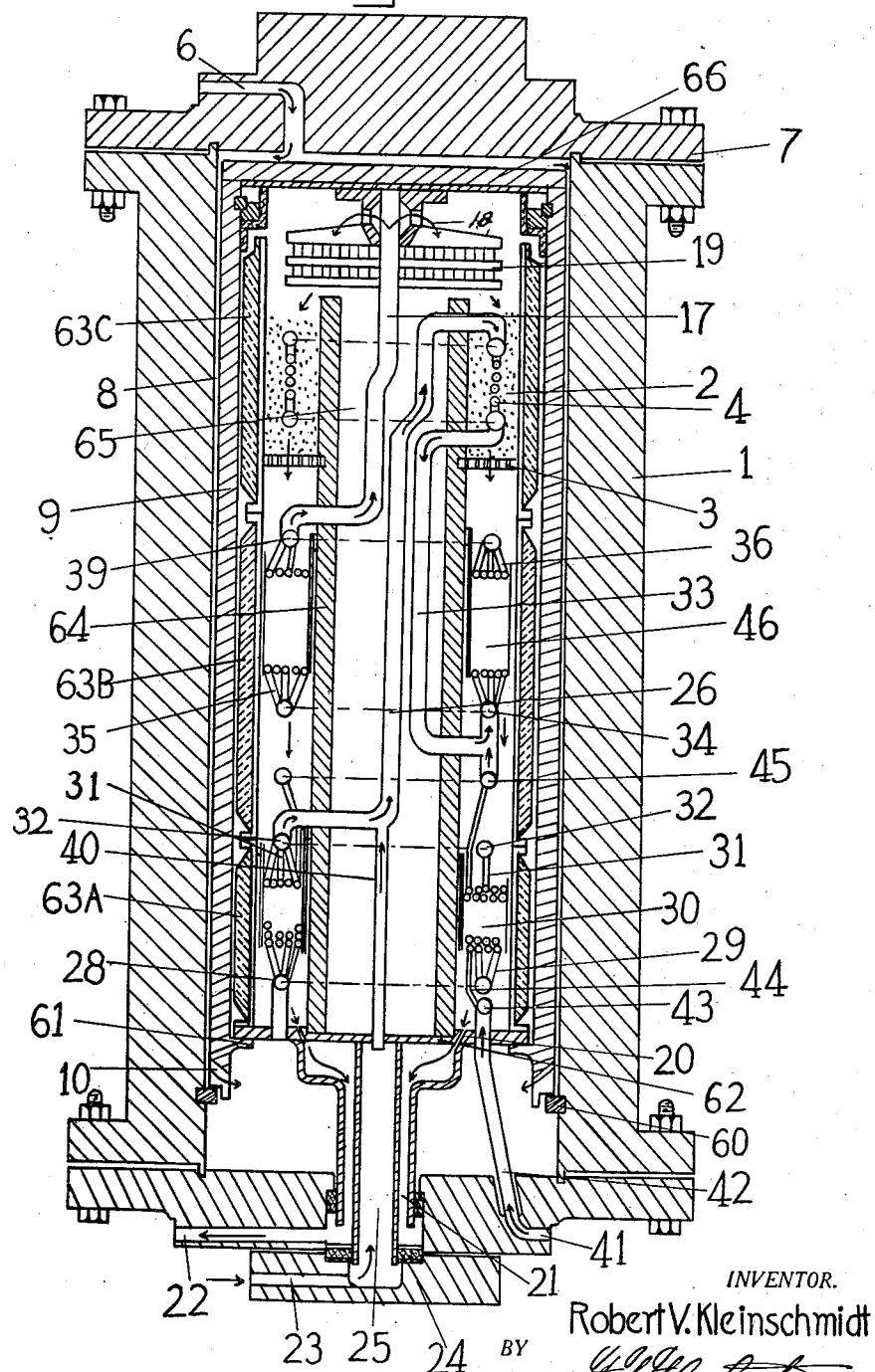
Figure 3:
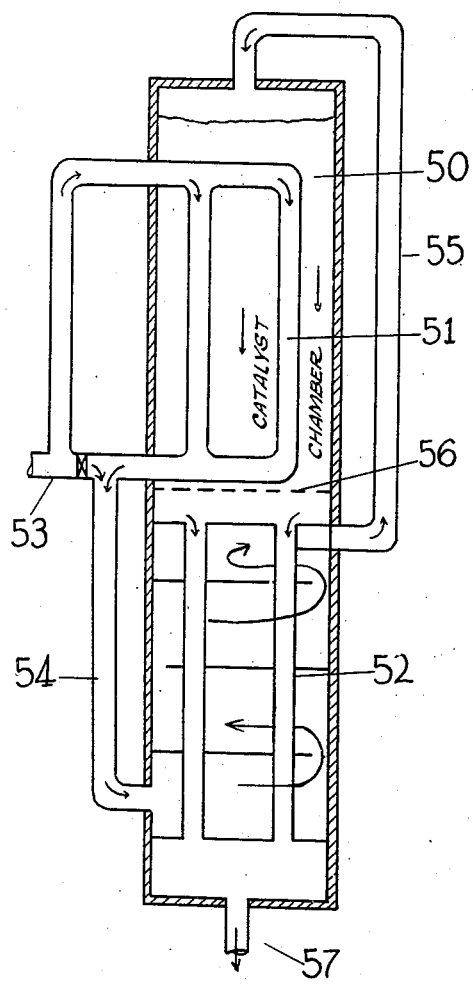
Figure 4:
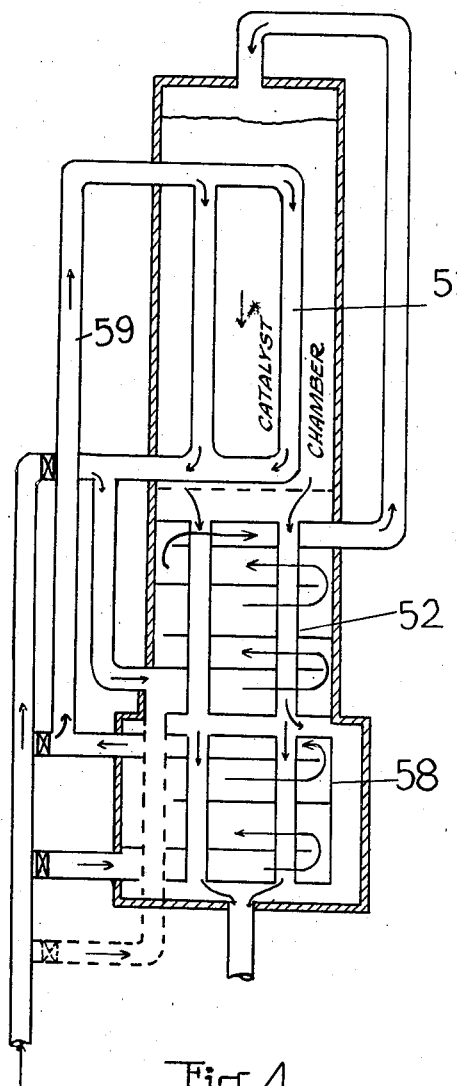

In order that my process may be more readily understood reference is made to the drawings in which:

Figures 1 and 2 represent respectively vertical cross sections of preferred embodiments of apparatus suitable for carrying out my process, while Figures 3 and 4 illustrate diagrammatically two methods of conducting the gases thru the various parts of an apparatus in accord with my invention.

In Figure 1 the upper part of the converter shell 1 is provided with an annular catalyst chamber 2 having a lower gas-permeable screen 3 and an internal coil-tube heat exchanger 4. The use of the terms "internal" and "external" as applied to heat exchange and means therefor has reference to the location of the same with reference to the catalyst bed and not to the apparatus as a whole, i. e. an internal heat exchange would be within the catalyst bed, an external heat exchange outside the bed, and may be within the pressure resisting wall, which encloses the whole converter or bomb, or outside same. An external heat exchanger 5 is provided in the lower portion of the converter shell 1. The gases to be converted enter through the inlet 6 provided in the upper converter cap 7. The gases from the inlet 6 flow through the annular wall-cooling pass 8 provided between the converter shell 1 and the cylindrical wall 9. This cylindrical wall 9, which will be more fully described hereinafter, provides a ready means of removing all internal parts of the converter from the shell 1. After traversing the wall cooling pass 8 the inlet gases then pass through slots 10 provided in the lower end of the cylinder 9 and thence into pipe 11. From pipe 11 the entering gases are led into the header 13 from which they pass through a plurality of tubes 14 into the external heat exchanger 5, which may be a tubular or coil type exchanger or any suitable type of heat exchanger, in which they are subjected to heat exchange relation to, but out of contact with, the gases leaving the catalyst. In effect, the entering gases flow counter-current to the flow of gases from the catalyst in this exchanger. From the external heat exchanger 5 the gases are collected in header 16 from the plurality of tubes 15, through which they are led into the conduit 17 from the upper portion of which they pass through holes 18. The gases are then further heated if required by means of the electric heater 19 over which they are caused to flow, and after this treatment they pass into the catalyst in the catalyst chamber 2. From the catalyst bed 2, and after conversion therein, they are conducted through the gas permeable screen 3 around the outside of the tubes within the external heat exchanger 5, through the slots 20, and passages 21, and 22, from the converter.

The heater 19 is used in the alcohol synthesis only for initiating the proper reaction temperature, after the reaction has started it is seldom necessary, in this type of synthesis, to introduce heat by this means, the reaction if properly controlled being autothermal. In some reactions not evolving as much heat as the alcohol synthesis it may be found necessary to maintain a certain amount of heat input through this heater while in others this heating means may be entirely dispensed with.

In many reactions such as the methanol synthesis from carbon oxides and hydrogen, the catalyst bed generates considerable heat. In order to effect accurate control of the reaction temperature within the catalyst bed, some means must, therefore, be employed to carry away the excess heat of the reaction. This is well accomplished in the present converter by means of the internal heat exchanger 4 which is positioned within the catalyst bed 2. This internal heat exchanger 4 is fed by inlet gases from the auxiliary inlet 23 provided in the lower cap 24 of the converter. From inlet 23 the entering gas passes through the conduits 25 and 26 into the internal heat exchanger 4 which is imbedded in the catalyst. The gases entering the internal heat exchanger flow in effect cocurrent to but out of contact with the gases undergoing the conversion; upon passing through the last coil of the exchanger the preheated gases then are conducted by the conduit 27 to the conduit 11 wherein they mingle with the inlet gases entering the converter through inlet 6. The advantages derived from carrying out a reaction in this manner, i. e. by passing one portion of the gas first to the internal heat exchanger and then to the external heat exchanger and another portion of the gas only to the external heat exchanger are many and will be more fully described hereinafter.

In Figure 2 two external heat exchangers are provided within the converter, whereby more accurate and exacting control of the temperature, within the catalyst bed as well as of the gases entering and leaving the catalyst chamber, is possible. One portion of the entering gas as in Figure 1 enters the converter through the inlet 6, wall-cooling pass 8, and slot 10 into the header 28, from which it is distributed through the plurality of tubes 29 into the first external heat exchanger 30. From this exchanger the preheated gas is collected by a plurality of tubes 31 in the header 32, from which it is conducted, thru conduit 26, into the internal heat exchanger 4 imbedded in the catalyst. Issuing from heat exchanger 4, wherein the gases are flowing in cocurrent relation to but out of contact with the gases undergoing conversion, they are conducted by conduit 33 into header 34 from which they are distributed by a plurality of tubes 35 into a second heat exchanger 46 wherein the gases are further heated by flowing countercurrent to but out of contact with the converted gases and from which they issue through tubes 36 into the header 39. From this header the gases are then conducted thru conduit 17 and slots 18 over the electric heater 19 and then directly into contact with the catalyst in chamber 2. After conversion they pass thru the gas-permeable screen 3 around the heat exchange tubes in the second exchanger 46 and first exchanger 30, respectively, then thru slots 20, annulus 21, and outlet 22, from the converter.

A second portion of inlet gas is conducted thru the inlet 23 and conduits 25 and 40 into the conduit 26 wherein this portion of inlet gas mingles with that which has been preheated in the first external heat exchanger 30 and flows with that gas in the manner as described.

A third portion of the inlet gas passes thru the inlet 41 and conduit 42 into the header 43; a plurality of tubes 44 conduct the gas from the header into the first external heat exchanger 30 from which the gas passes to the header 45, after leaving which the gas mingles with the preheated gases from tube 33 and passes with those gases into the header 34, flowing with them thru the converter in the manner already described.

In Figures 1 and 2 the gas flow into the passages 6, 22, and 41 is controlled by suitable valves, not shown, whereby the amount of gas thru any of these passages may be regulated from a minimum of zero to a maximum of all the gas passing thru the converter. It is possible by such an arrangement to accurately control the temperature within the catalyst bed, and accordingly the progress of the reaction.

By reference to Figure 2 the following description of a preferred method of constructing my conversion apparatus may be more readily understood. The conduits 17, 26, 33, and 40 are assembled in the central tube 64 and secured thereto. The base plate 62 is then welded to the central tube 64. The assembly of the exchangers 30, 46 and 4 on the central tube 64 is then made and is followed by the application of the separate insulating cylinders or shells 63a, 63b, and 63c. The insulating jackets may be constructed by building up about a steel cylinder an insulating wall of suitable thickness. This may be accomplished by winding the cylinder with insulation, by forming an annular chamber to be filled with diatomaceous earth, or by formation in any other suitable manner. Each insulating jacket may be provided with flanges for fixing to the other insulating jackets provided within the converter. The jacket 9 is then slipped into place, the heater 19 installed and the jacket head 66 secured in its seat. The thus assembled converter is then lowered into the pressure-retaining vessel 1 and the caps 7 and 24 bolted into place.

Attention is directed to the facility with which the converter is assembled. This is made possible by the rigidity of the structural member, the central cylinder 64, which has the function of acting as a passageway for the conduits 17, 26, 33 and 40, as a strength backbone of the converter, and as a foundation upon which to assemble the various units. Heretofore converter designs of this general character have utilized the outer cylindrical shell as the unit upon which the internal mechanism of the converter is supported. Some of the outstanding advantages of this construction over the former constructions are: ease of assembly and disassembly of the converter, facility with which the internal and external exchangers may be interconnected, the cylindrical space within the inner cylinder 64 thru which the gases or products of the reaction may be conducted to or from any of the various compartments, and many other advantages which are apparent to those skilled in this art.

Instead of using a single cylinder 64 as described above a section cylinder, as indicated in Figure 1 by 64a and 64b, may be employed. After assembly, the concentric cylinders 64a, 64b, and 63a and 63b, respectively, would form individual sections or units. When assembling a converter constructed in this manner it is generally preferable to completely assemble the lower sections and subsequently build the next section on the one below.

Another feature of my invention resides in the use of separate, easily mountable and demountable insulating shells 63a, 63b, and 63c. (These shells may be in sections as shown in Figure 2, or as a single unit enclosing all chambers.) On converters heretofore used the insulation has been applied in such a way that it has been necessary to strip it off before repairs to the inner cartridge of the converter could be made. This involved considerable labor both in removing and applying a new insulating layer. A converter constructed according to my invention may be readily repaired by simply slipping off the insulating shells which may be effected after unbolting or otherwise separating the section to be removed from the others.

The outstanding features of the converters include a cocurrent internal heat exchanger in which the temperatures of the cooling gases at the entrance is controllable at will and in which the flow therethru may, if desired, be varied independently of the flow thru the catalyst bed. This, as the description of the drawings has shown, is brought about by the use of two exchangers 30 and 46, Fig. 2; more exchangers may, of course, be used, which are external to the catalyst chamber, as illustrated in Figure 2, and one external exchanger 5 in Figure 1 aided by the auxiliary gas inlets which permit by-passing a portion of the incoming gases around these heat exchangers. Many of the advantages of operating a converter such as that described in Figure 2 will be apparent to those skilled in this art. The external heat exchanger 30 (Fig. 2) takes the gas at approximately bomb inlet temperature, that temperature being somewhat raised by the passage of the gas thru the wall cooling pass 8, and raises it to the temperature desired at the inlet of the internal exchanger 4. If desired, the external exchanger 30 (Figure 2) may be by-passed by means of a "cold shot", i. e. cold gas, thru conduits 25 and 40 which allows control of the temperature of the gas entering the internal exchanger 4 over a range of a maximum depending upon the size and efficiency of the external exchanger 30, down to approximately the bomb inlet gas temperature. The temperature relation between the gas from the external exchanger 30 to that leaving the internal exchanger 4 determines the major portion of the heat removed from the catalyst in the catalyst chamber 2. A second "cold shot" or by-pass around the internal exchanger 4, which is effected thru inlet 41 and means 42, 43, 44, and 45, allows the total flow thru the internal exchanger 4 to be decreased. This decrease in flow causes a greater temperature rise in the gas passing thru the internal exchanger 4 and reduces the relative heat transfer of the exit end of the bed, as compared with the entrance end. Even with full flow thru the internal exchanger 4 there will usually be a very appreciable temperature rise in this gas and a consequent reduction in heat transfer due to the diminution of the temperature difference existing at the exit of the bed.

In certain reactions, as, for example, the alcohol reaction with low percentage of inlet carbon monoxide, the reaction decreases as the gas advances thru the catalyst bed so that this reduction in heat removal capacity at the exit end of the bed is desirable. In other cases, however, as in the case of alcohol synthesis with high carbon monoxide gas, the heat generated thruout the length of the bed is substantially constant. It may even happen that due to the slight increase in bed temperature that is usually desirable or necessary between the entrance and exit or due to the presence of secondary reactions between products of the initial reaction, the heat generated in the exit end of the bed may be greater than that at the entrance end of the bed. Under these conditions, it is necessary to rather more than compensate for the decreased temperature conditions at the exit end of the bed by an increase either in heat transfer surface (as by the use of fins on the lower extremities of the tubes in the internal exchanger 4 of Figure 2, for example), or in mass velocity (as by the use of tapered cores in the cooling tubes in the internal exchanger 4); or finally in space velocity in the catalyst bed by use of a reduced bed cross-section or reduced amount of catalyst per unit of bed length. These measures for increasing heat transfer or for reducing the heat generated at the end of the bed need not be fitted with any high degree of accuracy to any particular assumed reaction. It is only necessary that they be at least effective enough to more than compensate for the more than usual temperature difference at full flow thru the internal exchanger 4. Final adjustment of the heat removal is then made during operation by reduction in flow thru the internal exchanger 4 by means of the gas flowing thru the second cold shot mentioned above.

In many instances the gas leaving the internal exchanger tubes will not usually be heated to the proper temperature for direct contact with the catalyst so that a second external exchanger, designated in Figure 2 as 46, is provided, which, working on a relatively small temperature difference, raises the temperature of all the gas that is about to enter the catalyst bed, to the proper value. The terminal difference on this exchanger is the minimum rise in temperature that can be expected thru the length of the catalyst bed and consequently it may be and usually is desirable to make it as small as possible.

In order that two of the many possible modifications of my invention may be more clearly visualized, Figure 3 is given illustrating diagrammatically the gas flow thru a converter system containing a catalyst bed 50, an internal exchanger therein 51, and an external exchanger 52. The gas entering a converter of this type passes thru the entrance conduit 53 and thereafter divides into two streams, the first passing thru the catalyst bed 50 in cocurrent heat exchange with the gas undergoing conversion therein, and issues from the internal exchanger 51 into the conduit 54 wherein it is admixed with another portion of the gas from the conduit 53. The combined gaseous mixture then enters the external heat exchanger 52, flowing counter-current and in heat exchange relation to but out of direct contact with the gas from the converter and from this external heat exchanger 52 passing into the conduit 55 and from there directly into the catalyst bed 50. From this bed it passes successively thru the gas permeable screen 56, the external heat exchanger 52, and out thru the exit pipe 57. By this diagrammatic representation and suitable valving means, all or only part of the gas may be passed thru the internal exchanger 51, thereby allowing a wide variation in the quantity of heat that may be removed from the catalyst bed 50 and, furthermore, enabling the operation of the process within the optimum temperature range by admixing with the preheated gases cool gases at substantially bomb temperature which are brought within the desired temperature range by means of the external heat exchanger 52. This diagrammatic set-up allows for many vapor phase catalytic reactions with sufficient heat control means whereby the reaction within the catalytic mass is controlled within the proper limits.

The modification of my process illustrated diagrammatically by Figure 4 affords even better temperature control than that shown in Figure 3, it being an extension of the improvements found in the former modification. This modification comprises in addition to the internal heat exchanger 51 and external heat exchanger 52 found in Figure 3 an additional external heat exchanger 58. Entering an apparatus of this kind the gas is divided into three streams. The first goes directly into the lower external heat exchanger 58; the second to the exit end of the exchanger 58, and mingles there with the first stream. The relative flows of these two streams are controlled at will by split valves or other means so that the heat content of the combined gases at the exit of the external exchanger 58 is of the desired amount. The combined first and second streams then pass thru conduit 59 into the internal exchanger 51 wherein they flow cocurrent with but in heat exchange relation to the gases undergoing conversion. At the exit end of this exchanger, the third stream of gas which may or may not have gone thru the external exchanger 58 in a separate path (the dotted conduit indicates this pass), is mingled with the first and second streams and all three enter the exchanger 52 together. Leaving this exchanger, they pass into the catalyst bed, flowing in the same direction as the gas in the internal exchanger tube 51, and on leaving the catalyst bed, they pass successively thru the exchangers 52 and 58 and then leave the converter. The flexibility of a converter of this type is evidenced by the ease with which gas at bomb temperature or for that matter even cold gas may be passed into various positions within the converter. This, of course, increases greatly the flexibility of control and enables operation of the process within very narrow temperature limits.

When conducting the methanol synthesis in an apparatus such as that described in Figure 2 and Figure 4, the exchangers 30 and 58, respectively, should have ample surface so that they may work on a maximum terminal difference of about 10° C. which represents a reasonably small rise in temperature in the catalyst bed. If desired, this rise may all be taken at the end of the bed by extending the catalyst bed a certain distance beyond the tubes of the internal heat exchanger 4 as shown in Figure 2.

It is to be understood that the invention is not to be confined to the method and apparatus shown for effecting the improvements, as such method or apparatus may be varied in numerous ways without departing from the nature of the invention or sacrificing any of the advantages that may be derived therefrom.

I claim:

1. The method of effecting catalytic exothermic gaseous reactions which include passing a portion of the entering gas within and in heat exchange to but not in contact with the catalyst, thereafter combining this portion of the gas with another portion of the entering gas, subjecting the gases to further thermal treatment by heat exchange but not in direct contact with gases issuing from direct contact with the catalyst, and then introducing them into direct contact with the catalyst.

2. The method of effecting catalytic exothermic gaseous reactions which include passing a portion of the entering gas within and in heat exchange to but not in contact with the catalyst, combining this portion of the gas with another portion of the entering gas, subjecting the gases to further thermal treatment by heat exchange but not in direct contact with gases issuing from direct contact with the catalyst, introducing them into direct contact with the catalyst, regulating the temperature of the catalyst and controlling the amount of gas introduced before and after heat exchange within the catalyst.

3. In a process of effecting a catalytic exothermic gaseous reaction involving internal and external heat exchange of the reaction gases with the catalyst and the converted gases issuing therefrom, respectively, the steps which comprise passing a portion of the entering gas within and in heat exchange to but not in contact with the catalyst and in cocurrent heat exchange with the gases undergoing conversion, combining this portion with another portion of the entering gas and, after subjecting the combined gases to heat exchange with the converted gases, introducing them into direct contact with the catalyst.

4. In a process of effecting a catalytic exothermic gaseous reaction involving internal and external heat exchange of the reaction gases with the catalyst and the converted gases issuing therefrom, respectively, the steps which comprise passing a portion of the entering gas in internal heat exchange to but not in direct contact with the catalyst and in cocurrent heat exchange with the gases undergoing conversion, combining this portion of the gas with the remaining portion of the entering gas and after subjecting the combined gases in countercurrent heat exchange with the converted gases, introducing them into direct contact with the catalyst, the volume of gas which is in cocurrent heat exchange with the gases undergoing conversion being independent of the volume of gas which contacts directly with the catalyst.

5. In a process of effecting catalytic exothermic gaseous reactions involving internal and external heat exchange of the reaction gases with the catalyst and the converted gases issuing therefrom respectively, the steps which comprise passing one portion of the entering gas into heat exchange with the gases issuing from the catalyst, conducting the thus preheated gas in heat exchange to but not in contact with the catalyst, combining the thus treated gas with another portion of the entering gas and, after subjecting the combined gases to heat exchange with the converted gases, introducing the thus preheated gases into direct contact with the catalyst.

6. In a process of effecting catalytic exothermic gaseous reactions involving internal and external heat exchange of the reaction gases with the catalyst and the gases issuing therefrom respectively, the steps which comprise passing one portion of the entering gas in heat exchange with the gases issuing from the catalyst, combining this preheated gas with a second portion of the entering gas, conducting the combined gaseous mixture out of contact with but in heat exchange to the catalyst, combining the thus treated portions with a third portion of the entering gas, and after subjecting the combined gases to heat exchange with the converted gases, introducing them into direct contact with the catalyst.

7. In a process of effecting catalytic exothermic gaseous reactions involving internal and external heat exchange of the reaction gas with the catalyst and the converted gases issuing therefrom respectively, the steps which comprise passing a portion of the entering gas in heat exchange with the converted gases issuing from the catalyst, conducting the thus preheated gas in heat exchange to but out of contact with the catalyst, combining the thus treated gases with another portion of the entering gas which has been subjected to heat exchange with the converted gases, and after subjecting the combined gases to heat exchange with the converted gases introducing the thus preheated gases into direct contact with the catalyst.

8. In a process of effecting catalytic exothermic gaseous reactions involving external and internal heat exchange of the reaction gas with the catalyst and the converted gases issuing therefrom respectively, the steps which comprise passing a portion of the entering gas into heat exchange with the converted gases issuing from the catalyst, conducting the thus preheated gases within and in heat exchange with but not in direct contact with the catalyst combining the thus treated gases with another portion of the entering gas which has been preheated by heat exchange with the converted gases issuing from the catalyst independently of the pretreatment of the first portion of the entering gas and after subjecting the thus combined gases to heat exchange with the converted gases introducing them into direct contact with the catalyst.

9. A converter system comprising a chamber having entrance and exit openings for the reaction gases, a compartment in said chamber containing a catalyst in which an internal heat exchanger is imbedded, an external heat exchanger in the gas stream issuing from the catalyst, and gas passages adapted to convey, between the internal heat exchanger, external heat exchanger, and catalyst, a portion of the entering gas directly to the entrance of the internal heat exchanger, another portion into the gas issuing from the internal exchanger, and the resulting gaseous mixture into the external heat exchanger, from which further passages convey the gases to the catalyst, the entrance passages to the internal heat exchanger and the catalyst being positioned at the same end of the catalyst chamber.

10. A converter system comprising a chamber having entrance and exit openings for the reaction gases, a compartment in said chamber containing a catalyst bed, an internal heat exchanger positioned within the catalyst bed, an external heat exchanger in the gas stream issuing from the catalyst, gas passages for conducting the entering gases to the entrance of the internal heat exchanger and the entrance of the external heat exchanger, a gas passage between the exit of the internal heat exchanger and the entrance of the external heat exchanger, and a gas passage from the exit of the external heat exchanger to the catalyst bed, the entrance to the internal heat exchanger and the catalyst bed being positioned at the same end of the catalyst bed.

11. A converter system comprising a chamber having entrance and exit openings for the reaction gases, a compartment in said chamber containing a catalyst bed, an internal heat exchanger positioned within the catalyst bed, a secondary external heat exchanger and a primary external heat exchanger thru which the gas stream issuing from the catalyst bed passes successively, and gas passages adapted to convey between the internal and external heat exchangers and the catalyst, one stream of entering gases directly into the primary heat exchanger, another stream of gas directly into the internal heat exchanger, and a third stream of gas directly into the secondary heat exchanger, further passages interconnecting the exit of the primary heat exchanger with the inlet of the internal heat exchanger and the exit of the internal heat exchanger to the entrance of the secondary heat exchanger, still another passage leading from the exit of the secondary heat exchanger to the catalyst bed, the entrance to the internal heat exchanger and the catalyst being positioned at the same end of the catalyst bed.

12. A converter system comprising a chamber having entrance and exit openings for the reaction gases, a compartment in said chamber containing a catalyst bed, an internal heat exchanger in the catalyst bed, and at least one external heat exchanger in another compartment in the chamber in which the converted gases are cooled and the incoming gases are heated, and a conduit within the chamber enclosing a space which permits the interconnection by passages of the catalyst bed, external and internal heat exchangers, in substantially all possible ways without interfering with the positions of the external or internal heat exchangers, the inlet passages to the internal heat exchanger and to the catalyst bed being at the same end of the bed.

13. A converter system comprising a converter shell containing heating and reaction chambers, a structural member positioned within the shell and removably mountable therefrom, an extended wall providing one wall of the heating and reaction chambers within the converter positioned on the structural member, the wall enclosing a space which permits the interconnection by passages of the heating and reaction chambers in substantially all possible ways without interfering with the positions of the heating and reaction chambers.

14. In a converter system having heating and reaction chambers enclosed in a converter shell the improvement which comprises providing the heating and reaction chambers in annular compartments, each compartment being a separate unit, and each unit being readily mountable on the other unit or units, the assembled units being mountable on a structural member which is readily slipped into and out of the converter shell.

15. In a converter system having heating and reaction chambers enclosed in a converter shell the improvement which comprises providing the heating and reaction chambers in annular compartments formed by the annulus between two coaxial cylinders, each compartment being a separate unit, and each unit being readily mountable on the other unit or units, the assembled units being mountable on a structural member which is readily slipped into and out of the converter shell.

16. A converter system comprising a chamber having entrance and exit openings for the reaction gases, a compartment in said chamber containing a catalyst bed, an internal heat exchanger in the catalyst bed, at least one external heat exchanger also in the chamber, through which the gas stream issuing from the catalyst passes, a conduit within the chamber about which is disposed the internal heat exchanger and at least one external heat exchanger, the conduit enclosing a space containing gas passages, which interconnect the catalyst bed, and internal and external heat exchangers to permit the flow of gas in all possible directions.

17. A converter system comprising a chamber having entrance and exit openings for the reaction gases, a compartment in said chamber containing a catalyst bed, an internal heat exchanger in the catalyst bed, and at least one external heat exchanger in another compartment in the chamber in which the converted gases are cooled and the incoming gases are heated, and a conduit within the chamber about which is disposed the internal heat exchanger and at least one external heat exchanger, the conduit enclosing a space containing passages which interconnect the catalyst bed, external and internal heat exchangers, in substantially all possible ways without interfering with the positions with the external and internal heat exchangers.

18. A converter system comprising a converter shell, reaction chambers, and external and internal heat exchangers, an elongated chamber within the shell, about which is disposed an internal heat exchanger and at least one external heat exchanger, the elongated chamber enclosing a space containing passages which interconnect the heating and reaction chambers in substantially all possible ways without interfering with the positions of the heating and reaction chambers.

19. A converter system comprising a converter shell containing heating and reaction chambers, the heating and reaction chambers being positioned between two co-axial cylinders, an elongated chamber enclosed by the innermost cylinder providing a conduit about which is disposed an internal heat exchanger and at least one external heat exchanger, the conduit enclosing a space containing pipes which interconnect the catalyst bed and heat exchangers in substantially all possible ways without interfering with the positions of the catalyst bed and heat exchanger.

20. In a converter system having heating and reaction chambers enclosed in a converter shell the improvement which comprises providing the heating and reaction chambers in annular compartments formed by the annulus between two co-axial cylinders, the chamber enclosed by the inner cylinder forming a passage about which is disposed the heating and reaction chambers, and within which passage are provided with gas passages which interconnect the heating and reaction chambers in substantially all possible ways without interfering with the positions of the heating and reaction chambers.

21. In a converter system having an internal heat exchanger, at least one external heat exchanger and reaction chambers enclosed in a converter shell, the improvement which comprises an inner cylinder upon which all the chambers are supported and about which is disposed an internal heat exchanger, a reaction chamber and at least one external heat exchanger, the inner cylinder enclosing an elongated chamber containing gas passages which interconnect the internal heat exchanger, external heat exchanger and reaction chamber.

22. In a converter system having heating and reaction chambers enclosed in a converter shell the improvement which comprises providing the heating and reaction chambers as separate annular compartments, each compartment being a separate unit, the separate units enclosing an elongated chamber upon which is disposed the heating and reaction chambers, the elongated chamber containing passages which interconnect the heating and reaction chambers, and each unit being readily mountable on the other unit or units.

ROBERT V. KLEINSCHMIDT.